H. Disston,
Sharpening Reciprocating Saws.
Nº 70,424.      Patented Nov. 5, 1867.

Witnesses            Inventor
Wm Albert Steel      H. Disston
S. K. Hoxie Coburn    By his attorney
                          H. Howson

United States Patent Office.

HENRY DISSTON, OF PHILADELPHIA, PENNSYLVANIA.

Letters Patent No. 70,424, dated November 5, 1867.

IMPROVED DEVICE FOR SHARPENING SAW-TEETH.

The Schedule referred to in these Letters Patent and making part of the same.

TO ALL WHOM IT MAY CONCERN:

Be it known that I, HENRY DISSTON, of Philadelphia, Pennsylvania, have invented an improved Instrument for Sharpening Saw-Teeth; and I do hereby declare the following to be a full, clear, and exact description of the same.

My invention consists of an instrument, fully described hereafter, by which the teeth of saws can be so filed that the proper depth and length of the teeth must always be accurately preserved.

In order to enable others familiar with mechanism of this class to make and use my invention, I will now proceed to describe its construction and operation, reference being had to the accompanying drawing, which forms a part of this specification, and in which—

Figure 1:
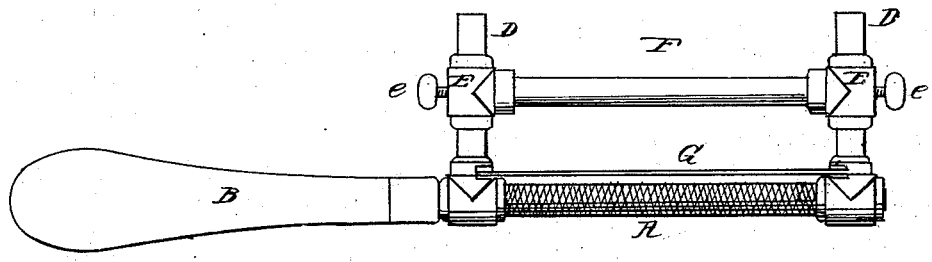
Figure 2:
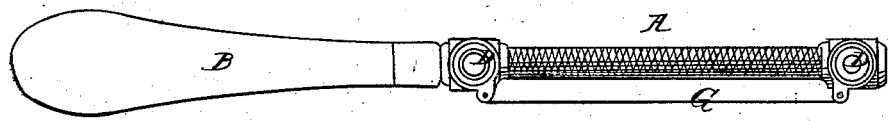

Figure 1 is a side view of one form of my instrument for sharpening saw-teeth,

Figure 2 a plan view, and

Figure 3:
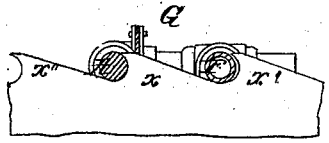

Figure 3 a sectional view of the instrument, showing its application to the teeth of a saw.

A is a cylindrical file, fitted to a suitable handle, B, and at or near each end of the file is secured, in any suitable manner, a projecting rod, D, to which is fitted a sliding piece, E, to be secured, after adjustment, by a set-screw, e, the two sliding pieces being connected together by or forming a part of a cross-bar, F. A cross-bar, G, also extends from one rod, D, to the other, for a purpose described hereafter.

The mode of using the instrument will be best observed on reference to fig. 3, where the cylindrical file A is in the act of cutting the hollow front of the tooth $x$, while the bar F rests on the top of the same tooth, and, as the cutting proceeds, is approaching the hollow front of the next tooth, $x'$, which has been cut by the file. The bar G also rests on the top of the tooth $x$, and regulates the depth of the cut. When the bar F reaches the hollow front of the previously-cut tooth $x'$, it is a certain indication that the tooth $x$ has been sufficiently filed, and that the instrument may be adjusted to operate on the tooth $x''$, and thus tooth after tooth may be filed until all are sharpened.

It will be evident that the instrument serves as a perfect gauge, the distance of the bar F from the file determining the length of the teeth, and the bar G deciding the depth of the cut to be made by the file. In other words, one finished tooth determines, by the aid of the instrument, the accurate finishing of the next tooth, while the shapes of the teeth are preserved, whatever may be the extent to which they are filed away.

The bar F may be readily adjusted to suit teeth of different lengths, and although the bar G is in the present instance shown as forming a permanent part of the instrument, it may be made adjustable thereon, so that the depth of the cut may be easily regulated. In large instruments the file may slide longitudinally, independently of the frame of the instrument, or a revolving cutter or stone may be substituted for the file.

Without confining myself to the specific arrangement or construction of parts herein described, I claim as my invention, and desire to secure by Letters Patent—

1. The combination of a file or cutter, A, and a cross-bar or guide, F, arranged in respect to the cutter as to determine the extent to which the latter shall penetrate the front of the saw-tooth, all substantially as described.

2. The combination of the above, and a bar, G, or its equivalent, so arranged as to determine the extent to which the cutter shall penetrate the saw-blade.

3. The mode, substantially as described, of rendering the bar F adjustable to and from the file A.

In testimony whereof I have signed my name to this specification in the presence of two subscribing witnesses.

HENRY DISSTON,

Witnesses:
 JOHN WHITE,
 W. J. R. DELANY.